(12) United States Patent
Kang

(10) Patent No.: US 7,044,565 B2
(45) Date of Patent: May 16, 2006

(54) TORSION BEAM AXLE SUSPENSION

(75) Inventor: Je-Young Kang, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 89 days.

(21) Appl. No.: 10/725,364

(22) Filed: Dec. 3, 2003

(65) Prior Publication Data

US 2005/0082904 A1  Apr. 21, 2005

(30) Foreign Application Priority Data

Oct. 16, 2003  (KR) .................... 10-2003-0072095

(51) Int. Cl.
*B60G 21/00* (2006.01)
(52) U.S. Cl. .............. 301/127; 280/124.106; 280/124.128; 280/124.169
(58) Field of Classification Search ............ 301/124.1, 301/127; 280/124.106, 124.128, 124.129, 280/124.13, 124.166, 86.751, 124.169
See application file for complete search history.

(56) References Cited

U.S. PATENT DOCUMENTS

| | | | | |
|---|---|---|---|---|
| 2,007,793 A | * | 7/1935 | Crawford | 301/124.1 |
| 3,333,865 A | * | 8/1967 | Boehner | 280/124.109 |
| 4,039,205 A | * | 8/1977 | Castanier | 280/124.109 |
| 4,513,990 A | * | 4/1985 | Morita et al. | 280/124.169 |
| 4,544,180 A | * | 10/1985 | Maru et al. | 280/124.106 |
| 4,834,416 A | | 5/1989 | Shimoe et al. | |
| 4,911,417 A | * | 3/1990 | Short | 267/256 |
| 5,326,128 A | * | 7/1994 | Cromley, Jr. | 280/656 |
| 5,370,196 A | * | 12/1994 | Bishop | 180/24.02 |
| 6,086,162 A | * | 7/2000 | Pinch et al. | 301/124.1 |
| 6,523,841 B1 | * | 2/2003 | Glaser et al. | 280/124.106 |

FOREIGN PATENT DOCUMENTS

JP  62-29406  *  7/1987

* cited by examiner

*Primary Examiner*—Russell D. Stormer
(74) *Attorney, Agent, or Firm*—Greenblum & Bernstein, P.L.C.

(57) ABSTRACT

In the torsion beam axle suspension of the present invention, by providing mounts formed on one end of each of trailing arms with a three-dimensional slant angle, when a transverse force is applied to a turning outer wheel at a rear suspension during cornering of a vehicle, toe-in characteristics are induced, and at the same time a transverse rigidity of the mounts can be increased.

2 Claims, 4 Drawing Sheets

[FIG. 1] PRIOR ART
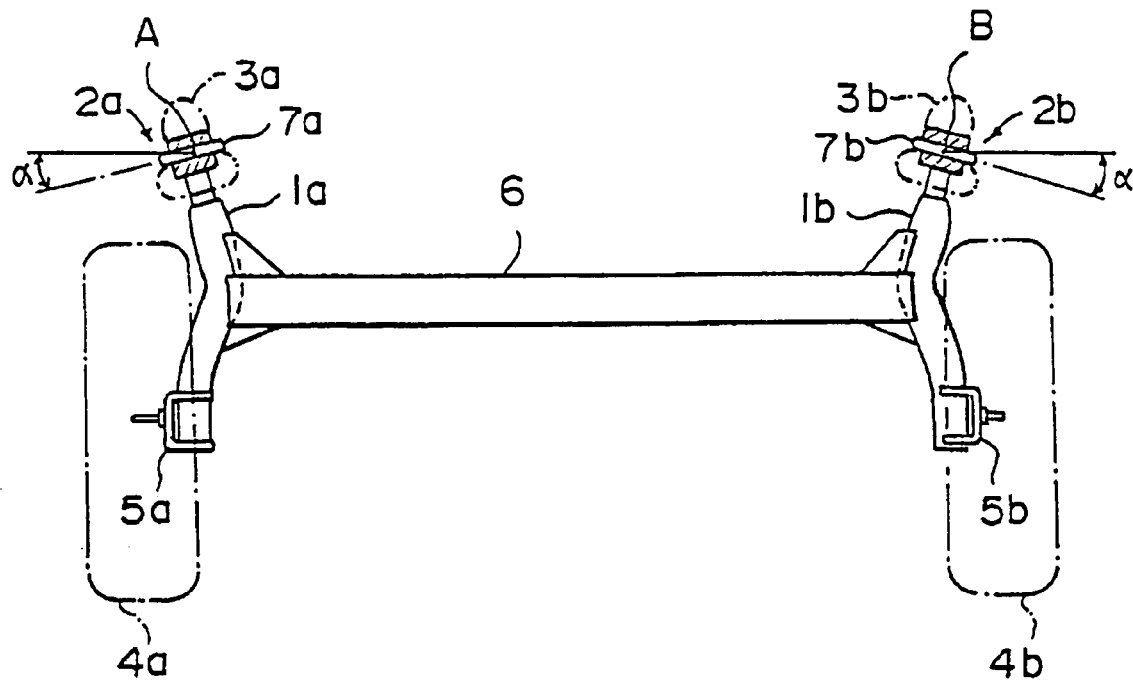
[FIG. 2] PRIOR ART
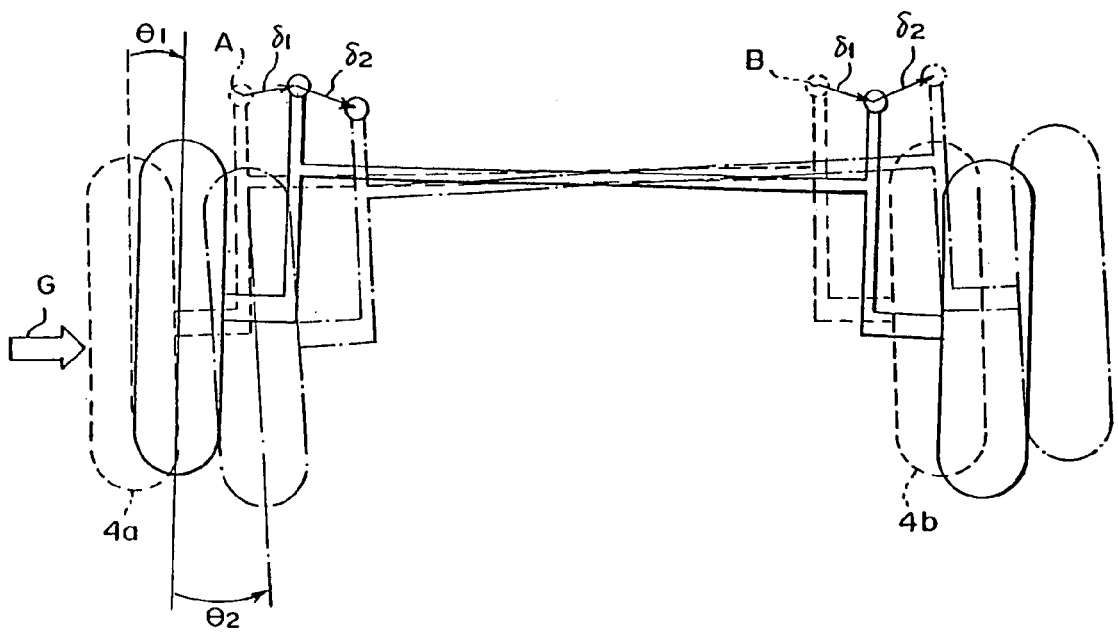

[FIG. 3]
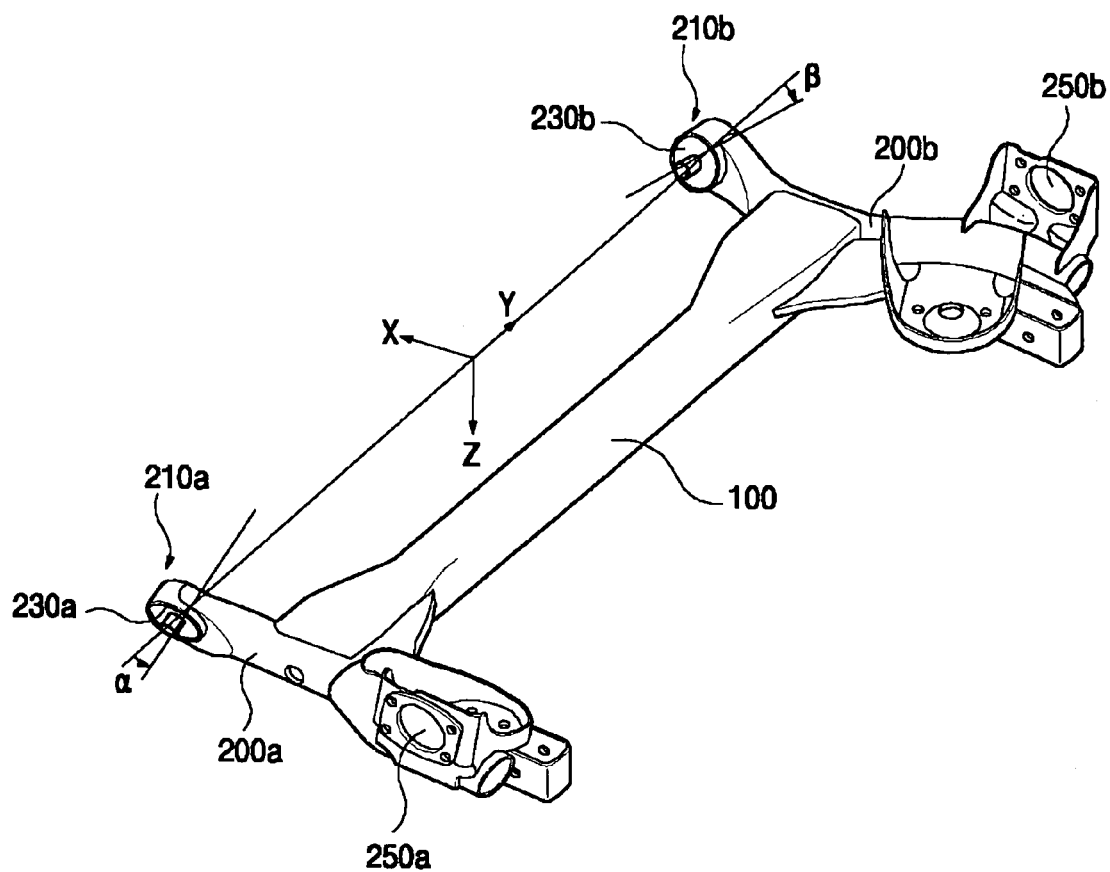

[FIG. 4]
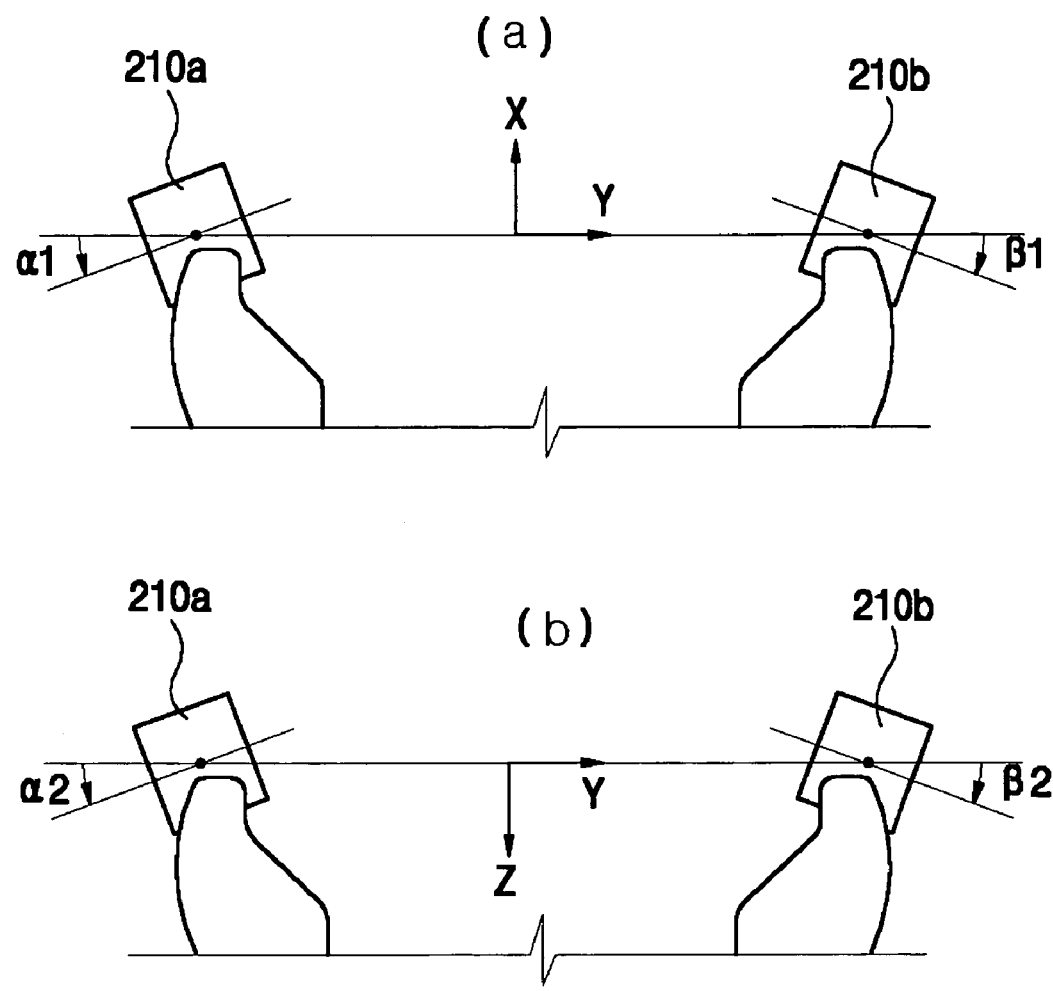

[FIG. 5]
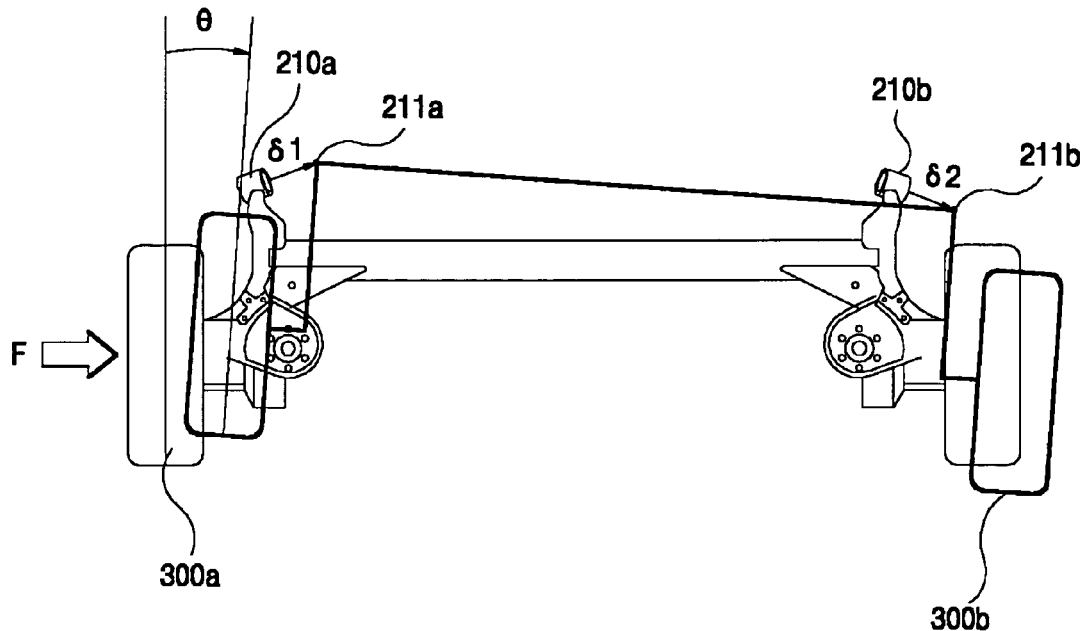
[FIG. 6]
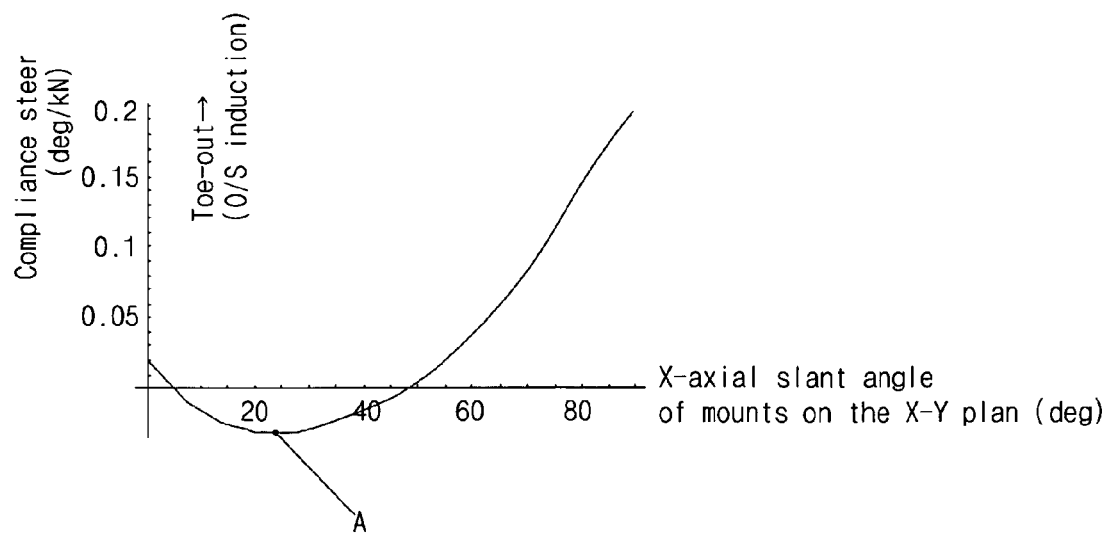

TORSION BEAM AXLE SUSPENSION

RELATED APPLICATIONS

The present disclosure relates to subject matter contained in priority Korean Application No. 10-2003-0072095, filed on Oct. 16, 2003, which is herein expressly incorporated by reference in its entirety.

BACKGROUND OF THE INVENTION

1. Field of the Invention

The present invention relates to a torsion beam axle suspension, and more particularly to a torsion beam axle suspension, in which a three-dimensional slant angle is given to mounts formed on one end of each of trailing arms.

2. Description of the Related Art

In general, a suspension in the vehicle is the apparatus, which is provided between a body and a wheel, for absorbing vibration or shock transmitted from a road surface during traveling to enhance stability such as turning stability, through connection of two linkages with one or multiple control arms, supporting by a spring and a shock absorber in upward and downward directions, and proper harmonization with high rigidity, flexibility, relative motion between the body and the wheel the other directions. Such a suspension is classified into a rigid axle suspension and an independent suspension in structure. The rigid axle suspension is employed to an rear axle for big vehicles such as buses, trucks and an rear axle for cars, while the independent suspension is to enhance a vehicle ride and stability by division of the axle and independent motion between both wheels, and is mainly employed to passenger cars.

The independent suspension includes a rear suspension, so-called a torsion beam axle suspension, which has a structure connecting right and left trailing arms to a torsion beam, and also has three types according to a position of attaching the torsion beam, such as an axle beam type (V-shape), a pivot axle type (reversed V-shape) and a coupled beam type (H-shape).

Such a torsion beam axle suspension is disclosed in U.S. Pat. No. 4,834,416.

FIG. 1 is a plan view illustrating a conventional torsion beam axle suspension, and FIG. 2 shows a state in which a transverse force is applied to the wheels of FIG. 1.

As shown in FIGS. 1 and 2, in a rear suspension of the vehicle comprising right and left trailing arms 1a and 1b respectively pivoted at the front ends for vertical swinging motion by way of bushings 2a and 2b, and a torsion beam 6 connecting the trailing arms 1a and 1b, the trailing arms 1a and 1b have swinging axes 7a and 7b inclined to intersect on the front side of the line joining the bushings 2a and 2b, and the bushings 2a and 2b are set to be nonlinear in such a manner that their elastic characteristics are different in small and large displacement ranges in relation to the direction perpendicular to the swinging axes 7a and 7b within the horizontal plane including the swinging axes of the trailing arms 1a and 1b In this manner, after angles of mounting brackets 3a and 3b are inclined on a plane, circumferential holes are formed in the bushings, and a resin plate is press-fitted into the holes. As a result, the bushings have nonlinear elastic characteristics. Thereby, a toe-in is realized with respect to a weak transverse force, and a toe-out is realized with respect to a strong transverse force. Unlikely, the toe-out is realized with respect to a weak transverse force, and a toe-in is realized with respect to a strong transverse force.

However, the torsion beam axle suspension has the following problems.

In the case where the toe-out is realized with respect to a turning outer wheel of the rear suspension during soft or hard cornering, there appears a tendency toward an over steer (O/S).

When this over steer appears strongly, this gives rise to a strong spin phenomenon. As a result, the vehicle is decreased in stability.

Further, by forming circumferential holes in the mounting bushings, or press-fitting the resin plate into the formed holes, the bushings have nonlinear elastic characteristics. Thus, the mounting parts have a reduced transverse rigidity.

Therefore, in order to secure continuous stability of the vehicle, it is necessary to maintain a linear toe-in relative to the transverse force as well as to secure sufficient transverse rigidity.

SUMMARY OF THE INVENTION

To solve the above-indicated problems, it is, therefore, an object of the present invention to provide a torsion beam axle suspension capable of inducing toe-in characteristics and simultaneously increasing transverse rigidity of mounts, when a transverse force is applied to a turning outer wheel at a rear suspension during cornering of a vehicle.

It is another object of the present invention to provide a torsion beam axle suspension capable of inducing linear toe-in characteristics under any condition of hard and soft cornering by generating a linear toe-in when a transverse force is applied, and thereby wheels tend toward an under steer, so that a vehicle can maintain continuous stability.

To achieve the above object, there is provided a torsion beam axle suspension, comprising: right and left trailing arms arranged in a longitudinal direction of a body; and a torsion beam connecting the right and left trailing arms, wherein each of the right and left trailing arms has one end provided with a mount into which a mount bush is fitted; and wherein each of the right and left mount bushes has a center axis, the center axis having the slope to be intersected on a plane formed of X and Y axes in front of a line connecting two center points of the right and left mount bushes and having an additional slope relative to a Z axis, the X axis being formed in the longitudinal direction of the body, the Y axis being formed in a width direction of the body, and the Z axis being formed in a height direction of the body.

With this construction, when a transverse force is applied to a turning outer wheel at a rear suspension during cornering of the vehicle, it is possible to induce toe-in characteristics and to increase transverse rigidity of the mounts at the same time.

In the foregoing construction, in the case where the elastic characteristics of the mount bushes becomes linear in the angular direction, the toe-in is linearly generated when the transverse force is applied. Thus, the toe-in characteristics can be induced under any condition of hard and soft cornering. Thereby, the wheels tend toward an under steer, and thus the vehicle maintains continuous stability.

According to this construction, there appear linear toe-in characteristics when the transverse force is applied to the turning outer wheel at the rear suspension during cornering of the vehicle, so that the vehicle maintains continuous stability. Further, it is possible to induce the linear toe-in characteristics of the turning outer wheel under any condition of hard and soft cornering Furthermore, the transverse rigidity of the mounts can be secured sufficiently.

BRIEF DESCRIPTION OF THE DRAWINGS

The above objects, features and advantages of the present invention will become more apparent from the following detailed description when taken in conjunction with the accompanying drawings, in which:

FIG. 1 is a plan view illustrating a conventional torsion beam axle suspension;

FIG. 2 shows a state in which a transverse force is applied to the wheels of FIG. 1

FIG. 3 is a perspective view illustrating a torsion beam axle suspension according to a preferred embodiment of the invention;

FIG. 4a is a plan view illustrating a state in which the mounts of FIG. 3 are slanted along an X-Y axis;

FIG. 4b is a plan view illustrating a state in which the mounts of FIG. 3 are slanted along an X-Z axis;

FIG. 5 shows a state in which a transverse force is applied to the wheels of FIG. 3; and FIG. 6 is a graph showing a change in compliance steer according to an angle at which the mounts of FIG. 3 are slanted.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 3 is a perspective view illustrating a torsion beam axle suspension according to a preferred embodiment of the invention. FIG. 4a is a plan view illustrating a state in which the mounts of FIG. 3 are slanted along an X-Y axis, and FIG. 4b is a plan view illustrating a state in which the mounts of FIG. 3 are slanted along an X-Z axis. FIG. 5 shows a state in which a transverse force is applied to the wheels of FIG. 3. FIG. 6 is a graph showing a change in compliance steer according to an angle at which the mounts of FIG. 3 are slanted.

As shown in FIG. 3, a torsion beam axle suspension includes right and left trailing arms 200a and 200b arranged in a longitudinal of a body, and a torsion beam 100 connecting the right and left trailing arms 200a and 200b.

The right and left trailing arms 200a and 200b are provided with mounts 210a and 210b on the front ends thereof, respectively. Mount bushes 230a and 230b are mounted inside the mounts 210a and 210b. The mounts 210a and 210b are coupled to the body via the mount bushes 230a and 230b.

The mount bushes 230a and 230b are made of an elastic material, and their elastic characteristics are linear in an angular direction.

As shown in FIG. 4a, center axes of the right and left mount bushes 230a and 230b each have a slope to intersect on a X-Y plane in front of a line connecting center points of the right and left mount bushes 230a and 230b.

Further, as shown in FIG. 4b, the center axes of the right and left mount bushes 230a and 230b each have a slope relative to a Z axis.

Of course, the Z axial slopes of the center axes of the right and left mount bushes 230a and 230b may have different slopes from each other, and are not limited to directions thereof. For instance, the center axes of the right and left mount bushes 230a and 230b are shown to intersect each other above a line connecting center points of the right and left mount bushes 230a and 230b, but there is no objection in case where intersect each other under the line connecting center points, and consequently it will do to have the Z axial slope.

In other words, as shown in FIGS. 4a and 4b, the right and left mount bushes 230a and 230b have slopes of $\alpha_1$ and $\beta_1$ on the Y plane respectively and additionally of $\alpha_2$ and $\beta_2$ on a Y-Z plane respectively, thus having three-dimensional slopes of $\alpha$ and $\beta$ on the X, Y and Z axial space.

Here, it should be noted that the X axis indicates a longitudinal direction of the body, that the Y axis indicates a width direction of the body, and the Z axis indicates a height direction of the body.

Meanwhile, although it has been described that the center axes of the mount bushes 230a and 230b have the slope on the X-Y plane and the additional slope relative to the Z axis, but they may have such a slope in any direction on the Y-Z plane and such an additional slope relative to the X axis.

Particularly, in the latter case, it should be noted that, because of the slope on the Y-Z plane, there is a possibility that the center axes of the mount bushes 230a and 230b do not have any point of intersection on the X-Y plane when they have the slope relative to the X axis. If so, it will do simply to incline the mount bushes 230a and 230b so as to have the point of intersection when the body is viewed on the top thereof.

Meanwhile, wheel connectors 250a and 250b are mounted to the rear sides of the right and left trailing arms 200a and 200b, and are coupled with wheels 300a and 300b, respectively.

Opposite ends of the torsion beam 100 are welded to the right and left trailing arms 200a and 200b, respectively.

Hereinafter, description will be made about an operation of the embodiment having the foregoing construction.

A transverse force F generated by a centripetal force during cornering of the vehicle, as shown in FIG. 5, is applied to the wheel 300a (the transverse force F shown in FIG. 5 is one generated when the vehicle turns right in the figure). As such, when the transverse force F is applied to the wheel 300a, the mounting bushes 230a and 230b are changed on the X-Y plane as much as $\delta 1$ and $\delta 2$ by As such, when the transverse force F is applied to the wheel 300a, the mounting bushes 230a and 230b are changed on the X-Y plane as much as $\delta 1$ and $\delta 2$ by inclination, when the mounts are subjected to a positional change from 210a to 211a, as well as from 210b to 211b.

In other words, the wheel 300a gives rise to a toe-in $\theta$ outside.

This effect is obtained because the mounts 210a and 210b have the slanted angles on the X-Y plane.

Therefore, as shown in FIG. 6, in the case where the X-axial slant angles of the mounts 210a and 210b are given at a desired angle (A point), the compliance steer is minimized toward induction of the toe-in when the transverse force is applied.

Furthermore, when the mount bushes 230a and 230b is slanted toward the Z axis, transverse rigidity can be increased.

In other words, by providing the mount bushes 230a and 230b with the three-dimensional slant angle within the space consisting of the X, Y and Z axes, when the transverse force is applied to the turning outer wheel 300a at the rear suspension during cornering of the vehicle, the toe-in characteristics are induced, and at the same time the transverse rigidity of the mounts 210a and 210b can be increased by about 20%.

Further, because the elastic characteristics of the mount bushes 230a and 230b are linear in the angular direction, the toe-in is linearly generated when the transverse force is applied. Thus, the toe-in characteristics can be induced under any condition of hard and soft cornering.

In this manner, in the case where the linear toe-in characteristics appear at the outer wheel 300a of the rear suspension, the wheels tend toward an under steer. As a result, the vehicle maintains continuous stability.

As mentioned in the prior art, the torsion beam axle suspension has three types, such as an axle beam type (V-shape), a pivot axle type (reversed V-shape) and a coupled beam type (H-shape). Herein, description has been made about the coupled beam type as example, but it is apparent to those skilled in the art that such description may also be true of the present invention the axle beam type and the pivot axle type.

While the invention has been shown and described with reference to certain preferred embodiments thereof, it will be understood by those skilled in the art that various changes in form and details may be made therein without departing from the spirit and scope of the invention as defined by the appended claims.

According to the torsion beam axle suspension as set forth above, there are the following effects.

First, because center axes of the right and left mount bushes each have the slope to intersect each other on the X-Y plane in front of the line connecting two center points of the right and left mount bushes and the additional slope relative to the Z axis, the toe-in characteristics are induced to the turning outer wheel at the rear suspension during cornering of the vehicle, and at the same time the transverse rigidity of the mounts can be increased by about 20%.

Second, because the elastic characteristics of the mount bushes become linear in the angular direction, the toe-in is linearly generated when the transverse force is applied. Thus, the toe-in characteristics can be induced under any condition of hard and soft cornering. In addition, the wheels tend toward an under steer, and the vehicle maintains continuous stability.

What is claimed is:

1. A torsion beam axle suspension, comprising:
right and left trailing arms arranged in a longitudinal direction of a body; and
a torsion beam connecting the right and left trailing arms,
wherein each of the right and left trailing arms has one end provided with a mount into which a mount bush is fitted, and
the right and left mount bushes each have a center axis, the center axis of each of the right and left mount bushes is set at an angle with respect to the Y axis in a plane formed by the X and Y axes, the center axis of each of the right and left mount bushes is set at an angle with respect to the Y axis in a plane formed by the Y and Z axes, the X axis being formed in the longitudinal direction of the body, the Y axis being formed in a width direction of the body, and the Z axis being formed in a height direction of the body.

2. A torsion beam axle suspension as claimed in claim 1, wherein the mount bushes have elastic characteristics which are linear in an angular direction.

* * * * *